United States Patent [19]

Gaylord

[11] 3,959,244

[45] May 25, 1976

[54] HYDROXY-TERMINATED POLYMERS OF BUTADIENE

[75] Inventor: Norman G. Gaylord, New Providence, N.J.

[73] Assignee: Dart Industries Inc., Los Angeles, Calif.

[22] Filed: Aug. 27, 1973

[21] Appl. No.: 392,136

[52] U.S. Cl................................ 526/84; 526/204; 526/208; 526/227; 526/335
[51] Int. Cl.²...................... C08F 136/06; C08F 8/00
[58] Field of Search................ 260/94.2 R, 94.7 A; 450/708.5

[56] References Cited
UNITED STATES PATENTS 3,084,141  4/1963  Kraus et al..................... 260/94.7 A
3,175,997  3/1965  Hsieh et al..................... 260/94.7 A
3,523,113  8/1970  Burke ................................. 260/94.2

*Primary Examiner*—Joesph L. Schofer
*Assistant Examiner*—Maria S. Tungol
*Attorney, Agent, or Firm*—Arthur S. Collins; Bryant W. Brennan; Fred S. Valles

[57] ABSTRACT

Hydroxy-terminated polymers of butadiene having two hydroxy groups per molecule are prepared by polymerizing butadiene in a chain transfer solvent at a temperature of from about 50° to about 170°C. with t-butyl beta-hydroxyethyl peroxide as an initiator.

9 Claims, No Drawings

HYDROXY-TERMINATED POLYMERS OF BUTADIENE

BACKGROUND OF THE INVENTION

Polymers and copolymers of butadiene have found a wide variety of uses. Butadiene is one of the frequently used constituents of elastomeric copolymers. A low molecular weight polybutadiene having two reactive groups, preferably at the ends of the chain, would be quite useful as a "coupling agent" in the preparation of copolymers. This invention provides a low molecular weight polybutadiene having two hydroxyl groups per chain.

DESCRIPTION OF THE PRIOR ART

Peroxides in general, including hydroxy dialkyl peroxides have long been known as polymerization catalysts. U.S. Pat. No. 2,605,291 teaches the preparation of beta-hydroxy dialkyl peroxides, including t-butyl beta-hydroxyethyl peroxide, and indicates that they can be used as initiators in polymerization reactions. U.S. Pat. No. 2,455,569 teaches that an isomer of t-butyl beta-hydroxyethyl peroxide, namely, t-butyl alpha-hydroxyethyl peroxide, can be used as a catalyst to polymerize a number of monomers, including styrene and butadiene. U.S. Pat. No. 2,414,769 is directed to the use of mixed dialkyl peroxides as polymerization initiators for unsaturated compounds such as styrene and butadiene. These catalysts are said to include compounds in which one or both of the alkyl groups may be hydroxy substituted; however, no specific examples of such substituted catalysts are disclosed. Lastly, U.S. Pat. No. 3,640,985 teaches the use of t-butyl beta-hydroxyethyl peroxide as a polymerization catalyst for fluorine containing ethylenically unsaturated monomers.

The prior art, while recognizing that t-butyl beta-hydroxyethyl peroxide is a polymerization catalyst and while further recognizing that hydroxy dialkyl peroxides in general will catalyze the polymerization of ethylenically unsaturated monomers such as styrene and butadiene, does not indicate that hydroxy-terminated low molecular weight polymers can be prepared with t-butyl beta-hydroxyethyl peroxide under certain specific reaction conditions.

SUMMARY OF THE INVENTION

It has now been discovered that a low molecular weight hydroxy-terminated polymer of butadiene having two terminal hydroxy groups per molecule can be prepared by polymerizing butadiene in a chain transfer solvent at a temperature of from about 50° to about 170°C. with t-butyl beta-hydroxyethyl peroxide as an initiator.

DETAILED DESCRIPTION

The polymers prepared in accordance with this invention are characterized by having end groups of the structure —$OCH_2CH_2OH$. Such end groups can result only from the use of t-butyl beta-hydroxyethyl peroxide as the catalyst initiator; thus, although various other peroxide compounds can be used as catalysts, the resultant products will not have these characteristic end groups. It is believed that with t-butyl beta-hydroxyethyl peroxide used as the catalyst, the actual polymerization initiator is the hydroxyl-containing radical resulting from the following decomposition:

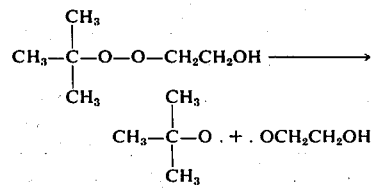

The isomeric compound, t-butyl alpha-hydroxyethyl peroxide is disclosed in U.S. Pat. No. 2,455,569 as a catalyst in the polymerization of unsaturated monomers including styrene and butadiene. It is believed, however, that the actual polymerization initiator in this case is the t-butoxy radical and not the hydroxyl-containing radical. With the alpha-hydroxyethyl isomer, the hydroxyl-containing radical is a hemiacetal of the structure:

which would be expected to undergo ketonic scission. Even assuming that the hydroxy-containing radical would be capable of initiating polymerization, the resulting polymer would have an end group of the structure:

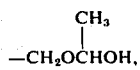

which would be a hydrolytically unstable hemiacetal and would undergo hydrolysis.

In order to obtain the low molecular weight butadiene polymers of this invention, it is necessary that the polymerization take place in a solvent having high chain transfer activity. Preferred solvents include alcohols and ketones having from 1 to about 5 carbon atoms, particularly isopropyl alcohol and methyl ethyl ketone. Also usable are such other well known solvents as xylene and dioxane.

The temperature of the polymerization reaction may range from about 50°C. to about 170°C., but should preferably be above 100°C. A temperature of about 120°C. has been found to be optimum.

The low molecular weight polybutadienes of this invention have a number average molecular weight ranging between about 2,000 and about 5,600. The molecular weight distribution is characterized by a $\overline{M}_w/\overline{M}_n$ ratio of between about 1.7 and 3.0. The number of hydroxy groups per chain ranges from between about 1.7 and 2.4. These polybutadienes generally yield a relatively high trans-1,4 polymer, te following microstructure analysis being typical of that obtained: about 62% 1,4-trans, about 17% 1,4-cis and about 21% 1,2-vinyl. Within the limits of the invention as above defined, this microstructure is independent of temperature variations, nature of the solvent, concentration of butadiene monomer and concentration of catalyst.

This invention will be better understood by reference to the following examples, which are included here for purposes of illustration only and are not to be construed as limitations.

EXAMPLE 1

Polybutadiene prepared with t-butyl beta-hydroxyethyl peroxide and no solvent.

An autoclave was charged with 630 grams of butadiene and 31.28 grams of t-butyl beta-hydroxyethyl peroxide, and the temperature was raised with stirring to 140°C. The temperature suddenly rose to 180°C., but was brought back to 140°C. with stirring which was continued for 1 hour. The autoclave was then cooled and the excess butadiene vented. On opening the autoclave, a dark brown liquid and a dark brown swollen solid were obtained. The liquid was separated, washed four times with 100 milliliters of methanol and then rotated at 60°C. on a rotary evaporator at 20 millimeters to remove all volatile materials. Yield of product was 14.4%.

EXAMPLE 2

Polymerization of butadiene with t-butyl beta-hydroxyethyl peroxide in isopropyl alcohol.

An autoclave was charged with 250 grams of butadiene, 161.3 grams of isopropanol and 32.16 grams of t-butyl beta-hydroxyethyl peroxide. The molar ratio of butadiene to isopropyl alcohol was 100/70. The temperature was raised to 120°C. and maintained at that level for two hours. The autoclave was then cooled and excess butadiene was vented. The liquid obtained on opening the autoclave was concentrated on a rotary evaporator. The residue was washed five times with 100 milliliters of methanol and evaporated at 60°C. at 20 millimeters to obtain a pale yellow viscous liquid. The yield was 84.55 grams, 32.82%.

EXAMPLE 3

Polymerization of butadiene with t-butyl beta-hydroxyethyl peroxide in methyl ethyl ketone.

Following the procedure of Example 2, 215 grams of butadiene, 202 grams of methyl ethyl ketone and 26.4 grams of t-butyl beta-hydroxyethyl peroxide were used. The yield was 45.9 grams of product, 21.35%.

EXAMPLE 4

Comparison of the products of Examples 1 through 3.

The polybutadiene products of Examples 1, 2 and 3 were measured for intrinsic viscosity and hydroxy number. From these values, the molecular weight and number of hydroxy groups per chain were calculated. The results are shown in the following table:

| Examples | $[\eta]$ dl./g. | $\overline{M}_w$ | Hydroxyl number mgKOH/g. | Hydroxyl groups per chain |
|---|---|---|---|---|
| 1 | 0.10 | 1,440 | 23.1 | 0.59 |
| 2 | 0.178 | 3,650 | 33.1 | 2.15 |
| 3 | 0.20 | 4,410 | 29.8 | 2.34 |

The data show that the products of Examples 2 and 3, which were prepared according to the methods of this invention, have approximately two hydroxy groups per chain, have a low molecular weight and are thus suitable for use as coupling polymers. The product of Example 1, which was prepared in the absence of a solvent, has a low molecular weight but with a value of only 0.59 hydroxy groups per chain, is totally unsuitable as a coupling polymer.

EXAMPLE 5

A one liter Paar reactor was charged with 150 milliliters of xylene and 1.8 grams of t-butyl beta-hydroxyethyl peroxide. 73.4 Grams of liquid butadiene was introduced and the reaction mass was brought to a temperature of 170°C. After two hours, the polymer was collected by precipitation in methanol containing 2,6-di-t-butyl-paracresol. The polymer was purified by dissolving in n-heptane and precipitation in methanol. The yield was 26.8 grams. Analysis of the polymer showed a number average molecular weight of 3600, $\overline{M}_w/\overline{M}_n$ of 3.0, and 2.4 hydroxyl groups per chain.

EXAMPLE 6

The general method of Example 5 was used. 82 Grams of butadiene in 165 milliliters of dioxane was polymerized with 10 grams of t-butyl beta-hydroxyethyl peroxide. Polymerization temperature was maintained at 120°C. for three hours to yield 26.7 grams of polymer. Analysis of the product showed a number average molecular weight of 3960, $\overline{M}_w/\overline{M}_n$ of 1.9, and 1.8 hydroxy groups per chain.

What is claimed is:

1. A process for preparing a hydroxy-terminated polymer of butadiene having about two terminal hydroxy groups per molecule comprising subjecting butadiene to polymerization conditions in a chain transfer solvent at a temperature of from about 50° to about 170°C. with t-butyl beta-hydroxyethyl peroxide as an initiator.

2. A process according to claim 1 in which the temperature is above 100°C.

3. A process according to claim 2 in which the temperature is between about 110° and about 130°C.

4. A process according to claim 1 in which the solvent is methyl ethyl ketone, isopropyl alcohol, xylene or dioxane.

5. A low molecular weight polybutadiene having about two hydroxy terminated end groups of the structure —OCH$_2$CH$_2$OH per molecule, said polybutadiene being prepared by subjecting butadiene to polymerization conditions in a chain transfer solvent at a temperature of from about 50° to about 170°C with t-butyl beta-hydroxyethyl peroxide as initiator.

6. A low molecular weight polybutadiene as in claim 5, wherein the number average molecular weight is at least about 2000.

7. A polybutadiene according to claim 5 prepared at a temperature greater than 100°C.

8. A polybutadiene according to claim 7 prepared at a temperature of from about 110° to about 130°C.

9. A polybutadiene according to claim 5 in which the solvent is methyl ethyl ketone, isopropyl alcohol, xylene or dioxane.

* * * * *